I. KOHN.
Broom Head.

No. 68,209.

Patented Aug. 27, 1867.

WITNESSES:
J. H. Burridge
Frank S. Alden

INVENTOR:

United States Patent Office.

ISAAC KOHN, OF EDGERTON, OHIO.

Letters Patent No. 68,209, dated August 27, 1867.

IMPROVED BROOM-HEAD.

The Schedule referred to in these Letters Patent and making part of the same.

TO ALL WHOM IT MAY CONCERN:

Be it known that I, ISAAC KOHN, of Edgerton, in the county of Williams, and State of Ohio, have invented certain new and useful Improvements in Broom-Heads; and I do hereby declare that the following is a full and complete description of the same, reference being had to the accompanying drawings, making a part of this specification, in which—

Figure 1:
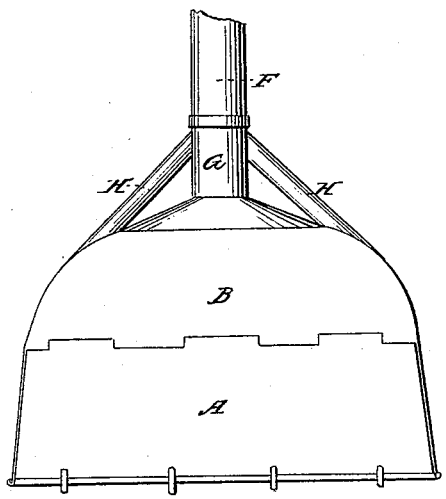
Figure 2:
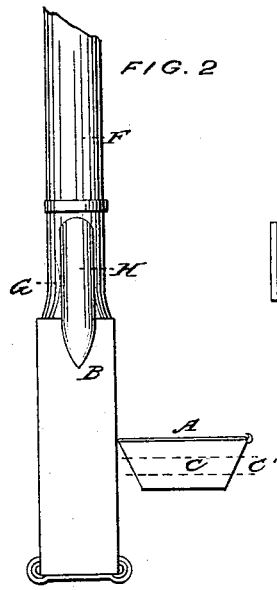
Figure 3:
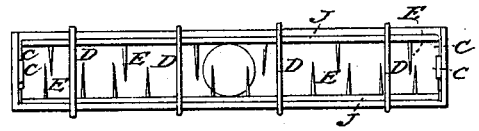

Figure 1 is a side view of the head.
Figure 2 is a view of the edge.
Figure 3 is an end view.
Like letters of reference refer to like parts in the views.

This head is constructed of tin or any other suitable material, and of the shape shown in fig. 1, in which it will be seen that the lower section A of the side is hinged to the upper section B, forming a kind of leaf, which can be opened as shown in fig. 2. The ends of this leaf are furnished with deep flanges C, which, on shutting the leaf, pass into a loop, C', close to the inside of the ends of the head or case, thus giving additional strength to it laterally. The leaf, when closed, is firmly and securely held thus by the hooks D, fig. 3. Projecting inward from each side of the case is a number of prongs or teeth, E, which are so arranged as to fall between each other on closing the leaf. F is the handle, inserted in the socket G, and which is supported or stayed by the braces H.

The application of this head for the purpose designed is as follows: The leaf of the case is opened, and a certain amount of broom-corn of the proper length and quality is then trimmed and shaped so that the stalk-end will fit in, and fill the head closely and compactly, which, on being done, the leaf is then shut, which clamps the corn tightly, and is held thus by the hooks referred to, by being passed through the straw and hooked upon the raised rim of the leaf, as seen in fig. 3, which, together with the prongs or teeth, will hold the straw or corn permanently and securely in place.

J, fig. 3, is a lining of soft leather, for the purpose of preventing the corn from being cut by the edges of the case, and thus adding greater durability to the broom, which, constructed in this way, is cheap, simple, and greatly economical, as, when the brush-corn is worn out, it can be easily replaced with new, which persons of ordinary intelligence can do for themselves.

What I claim as my improvement, and desire to secure by Letters Patent, is—

The leaf A, flange C, and loop C', arranged in relation to the hooks D, teeth E, and case, as and for the purpose substantially as specified.

ISAAC KOHN.

Witnesses:
O. G. W. EICHELBERGER,
JULIUS FRANK.